June 14, 1932. H. S. POLIN 1,863,253
ELECTRO CHEMICAL CURRENT INTERRUPTER
Filed July 17, 1930
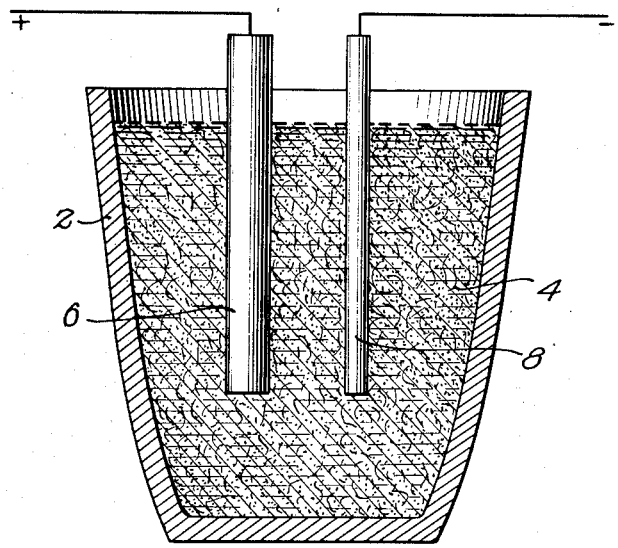
Inventor
Herbert S. Polin
By Fisher H Pedersen
Attorneys Patented June 14, 1932

1,863,253

UNITED STATES PATENT OFFICE

HERBERT S. POLIN, OF SAN FRANCISCO, CALIFORNIA, ASSIGNOR TO POLIN, INC., OF NEW YORK, N. Y., A CORPORATION OF DELAWARE

ELECTRO-CHEMICAL CURRENT INTERRUPTER

Application filed July 17, 1930. Serial No. 468,645.

This invention is an electro-chemical interrupter for an electric circuit.

The usual current interrupter involves mechanically movable parts, the circuit being broken by physically separating two elements, which separation causes more or less sparking or arcing, with resultant pitting and deterioration of the terminals.

With the present invention, there are no moving parts, but instead the two terminals or electrodes are embedded in a composition or "electrolyte" of a gelatinous or liquid nature which changes its conductivity with variations of temperature. The "electrolyte" is a mixture of a number of different substances, as will appear. That is to say, the conductivity of the composition, which for convenience will be called an electrolyte, (which term will be used in an illustrative sense and not in a limiting sense) will be such, at one temperature, that the current will flow from one electrode to the other, while at another temperature the conductivity of the composition will be such that the current will not flow, or such a very small amount of current will flow that the current may be considered as shut off. In other words, the temperature of the electrolyte seems to determine whether or not the current will flow. If there is a tendency to arc or spark, the arc or spark is quickly quenched.

The operation of the device seems also to depend considerably on the composition of the two electrodes as well as on the composition of the electrolyte. The preferred electrodes are mossy granite for the anode and metallic silicon for the cathode. These particular substances apparently have a cooperative relationship with the electrolyte itself for accomplishing the desired objects.

The invention described is not to be limited by any statement of theory here given; however, the electrolyte seems to have the property of conducting electricity when its temperature is below a critical temperature, and to have the property of shutting off the current, or of shutting off all except a very small residual current, which is so small as to be negligible in practical operation, when its temperature is above the critical temperature.

The precise critical temperature varies with the particular composition of the electrolyte; but with any particular electrolyte, the make or break is sharp at the critical temperature.

The temperature of the electrolyte is raised as the current passes through it; when the temperature of the electrolyte rises beyond the critical point, the current is substantially stopped; there usually is a small residual current flow even above the critical temperature, but this is so small as to be negligible. The claims are to be construed in view of this statement; that is to say, there may be a very small current flow even above the critical temperature, but for all practical purposes, the current can be considered as shut off and the electrolyte considered as a nonconductor when above the critical temperature. The greater the load in series with the interrupter, the more complete is the cut off. With the cessation of current flow, the electrolyte cools down to a point below the critical temperature, and the current flows. This heats the electrolyte, and the cycle is repeated. The timing of the cycle, that is to say, the number of makes and breaks per minute, depends on the composition of the electrolyte, the distance between the electrodes, and on the thermal factors, such as size and shape of the electrolyte mass, temperature of the surrounding air, etc.

The invention is particularly useful where high voltages are involved, as in luminous tube signs, such as the neon, argon, etc., signs, where there is a tendency to spark as the current is turned on and off.

The general features of the electro-chemical interrupter having been thus outlined, it will be described more in detail by reference to the accompanying diagrammatic drawing; this disclosure is simply illustrative of one possible way of carrying out the invention. It should be understood that it may be carried out in other ways, as falling within the scope of the claims.

Referring now to the drawing, a container 2, such as an alundum crucible or the like, carries an electrolyte 4, which is a pasty or gelatinous mass of sand, powdered zinc, fuller's earth, rotten stone and hydrochloric acid in approximately the following proportions:

| | Per cent |
|---|---|
| Sand | 10 |
| Powdered zinc | 20 |
| Fuller's earth | 10 |
| Rotten stone | 10 |
| Hydrochloric acid | 50 |

In this pasty or gelatinous mass is immersed a positive electrode 6 of mossy granite, or the like, and a negative electrode 8, of electro-metallic silicon or the like; the electrodes may be approximately a quarter of an inch apart. These electrodes seem to have a cooperative relationship with the electrolyte in producing the desired results.

The "electrolyte" may contain sufficient liquid so that it has the characteristics of a liquid. When in operation, the passage of the current agitates the liquid and keeps the solids in suspension.

The positive electrode 6 is connected in series with the machine, sign, or other translating device, and the positive side of the line, while the negative electrode 8 is connected to the negative side of the line.

It will be understood that the characteristics of the invention can be varied by varying the characteristics and composition of the electrolyte and the electrodes. Instead of relying on the passage of the current to heat the electrolyte, it could be heated by an external heating coil; and if desired, cooling means could be provided for cooling the electrolyte at a more rapid rate.

It should be understood that the invention is not to be limited to the precise embodiment disclosed, which is simply illustrative of one way of carrying out the invention, but may be carried out in other ways, as falling within the scope of the claims.

I claim as my invention:—

1. An electro-chemical current interrupter, comprising a pair of electrodes, and an electrolyte which changes from a conductor to a non-conductor at a certain temperature, and changes back to a conductor upon a return to its first temperature.

2. An electro-chemical current interrupter, comprising an electrolyte which, when on one side of a critical temperature, permits the flow of current, which, when on the other side of the critical temperature, stops the flow of current, and which, upon return to the first temperature, again permits the flow of current.

3. An electro-chemical current interrupter, comprising a pair of electrodes, and an electrolyte which is normally conductive of the current, but which, upon rise of temperature becomes a non-conductor and stops the further passage of the current, and which, upon a return to a lower temperature, again becomes a conductor.

4. An electro-chemical current interrupter, comprising a pair of electrodes, and an electrolyte which is normally conductive of the current, but which, upon rise of temperature becomes a non-conductor and stops the further passage of the current and which, when it cools off, becomes a conductor again and permits passage of the current.

5. An electro-chemical current interrupter, comprising a pair of electrodes, and an electrolyte which is normally conductive of the current, but which, upon rise of temperature due to passage of the current, becomes a non-conductor and stops the further passage of the current, and which, upon a return to a lower temperature, again becomes a conductor.

6. An electro-chemical current interrupter, comprising a pair of electrodes, and an electrolyte which is normally conductive of the current, in which, upon rise of temperature due to passage of the current, becomes a non-conductor and stops the further passage of the current and which, when it cools off, becomes a conductor again and permits passage of the current.

7. An electro-chemical current interrupter, comprising an acid electrolyte, and a pair of electrodes, one of which is metallic silicon, the assembly having the properties of conducting a current at one temperature, and of substantially shutting off the current at another temperature.

8. An electro-chemical current interrupter, comprising an acid electrolyte, and a pair of electrodes, one of which is mossy granite.

9. An electro-chemical current interrupter, comprising an electrolyte, and electrodes of mossy granite and metallic silicon.

10. An electro-chemical current interrupter, comprising a pair of electrodes, and an acid electrolyte containing sand, the assembly having the properties of conducting a current at one temperature, and of substantially shutting off the current at another temperature.

11. An electro-chemical current interrupter, comprising a pair of electrodes, and an acid electrolyte containing sand and zinc.

12. An electro-chemical current interrupter, comprising a pair of electrodes, and an acid electrolyte containing sand, zinc and fuller's earth.

13. An electro-chemical current interrupter, comprising a pair of electrodes, and an acid electrolyte containing sand, zinc, fuller's earth and rotten stone.

14. An electro-chemical current interrupter, comprising electrodes of mossy granite and metallic silicon, and an acid electrolyte containing sand.

15. An electro-chemical current interrupter, comprising electrodes of mossy granite and metallic silicon, and an acid electrolyte containing sand and powdered zinc.

16. An electro-chemical current interrupter, comprising electrodes of mossy granite and metallic silicon, and an acid electrolyte containing sand, powdered zinc and fuller's earth.

17. An electro-chemical current interrupter, comprising electrodes of mossy granite and metallic silicon, and an acid electrolyte containing sand, powdered zinc, fuller's earth and rotten stone.

In testimony whereof he affixes his signature.

HERBERT S. POLIN.